United States Patent [19]

Suzuki et al.

[11] Patent Number: 5,521,231
[45] Date of Patent: May 28, 1996

[54] PROCESS FOR PRODUCING THERMOPLASTIC COPOLYMER POWDER

[75] Inventors: Fumio Suzuki; Haruki Sato; Masaki Sugihara; Wataru Hadano, all of Otake, Japan

[73] Assignee: Mitsubishi Rayon Co., Ltd., Tokyo, Japan

[21] Appl. No.: 381,888

[22] PCT Filed: Aug. 31, 1993

[86] PCT No.: PCT/JP93/01221

§ 371 Date: Feb. 24, 1995

§ 102(e) Date: Feb. 24, 1995

[87] PCT Pub. No.: WO94/05722

PCT Pub. Date: Mar. 17, 1994

[30] Foreign Application Priority Data

Aug. 31, 1992 [JP] Japan .................. 4-232391
Apr. 1, 1993 [JP] Japan .................. 5-075655

[51] Int. Cl.$^6$ .................. C08F 6/22; C08J 3/12; C08J 3/16
[52] U.S. Cl. .................. 523/352; 523/309; 528/486; 528/487; 528/491; 528/502
[58] Field of Search .................. 523/352, 309; 528/486, 487, 502, 491

[56] References Cited

U.S. PATENT DOCUMENTS

| | | | |
|---|---|---|---|
| 3,992,350 | 11/1976 | Bensa et al. | 523/309 |
| 4,169,737 | 10/1979 | Burke, Jr. et al. | 523/201 |
| 4,374,941 | 2/1983 | Sandstrom | 523/334 |
| 4,874,841 | 10/1989 | Sugimori et al. | 528/491 |
| 4,897,462 | 1/1990 | Yusa et al. | 523/352 |
| 4,977,241 | 12/1990 | Sigimori et al. | 528/491 |
| 5,061,556 | 10/1991 | Dotzauer et al. | 523/200 |
| 5,064,938 | 11/1991 | Suzuki et al. | 528/491 |
| 5,273,823 | 12/1993 | Hwang et al. | 525/419 |

FOREIGN PATENT DOCUMENTS

| | | | |
|---|---|---|---|
| 63-35621 | 2/1988 | Japan | 528/491 |
| WO81/02578 | 9/1981 | WIPO . | |

OTHER PUBLICATIONS

Patent Abstracts of Japan, vol. 12, No. 391 (C–537), Oct. 18, 1988, JP–A–63 135 404, Jun. 7, 1988.
Database WPI, Derwent Publications, AN 86–323231, JP–A–61 241 106, Oct. 27, 1986.

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

A process for producing a thermoplastic polymer powder which comprises adding a polymer (B) and/or an inorganic compound (C) to a coagulation slurry or a powder of a thermoplastic polymer (A) obtained from emulsion polymerization and having a glass transition temperature Tg defined by the following equation (1), in an amount of 0.1–10 parts by weight to 100 parts by weight of the thermoplastic polymer (A), compacting the thermoplastic polymer (A) at a temperature in a range of (Tg–30) to (Tg+50)° C., and comminuting it:

$$Tg = W_1 \times Tg_1 + W_2 \times Tg_2 + \ldots + W_n \times Tg_n \quad (1)$$

wherein n is the number of the monomers forming the thermoplastic polymer (A); $W_1, W_2, \ldots W_n$ each represents weight fraction of each monomer i (i=1, 2, . . . n) in the polymer (A); and $Tg_1, Tg_2, \ldots Tg_n$ each represents the glass transition temperature of the polymer composed of each monomer i. According to the present invention, it is possible to remarkably enhance bulk specific gravity of thermoplastic polymers as compared with the case using the methods known in the art.

6 Claims, 1 Drawing Sheet

PROCESS FOR PRODUCING THERMOPLASTIC COPOLYMER POWDER

This application is a PCT application filed under 37 C.F.R. § 1,371.

FIELD OF ART

The present invention relates to a process for producing a thermoplastic copolymer powder with high bulk specific gravity.

BACKGROUND ART

It is desirable that thermoplastic resin powder has high bulk specific gravity in view of efficient utilization of the storage space of the powder as a product and incidental reduction of its transportation cost.

Hitherto, many studies have been made on the method for elevating bulk specific gravity of thermoplastic resin powder. For example, many researches have been conducted on means for improving powder properties of the powdery or granular polymers recovered from graft copolymer latices containing an elastomeric backbone polymer in a high ratio. For instance, U.S. Pat. No. 4,897,462 discloses a method for carrying out slow coagulation of a polymer latex in the presence of a coagulant of a specific concentration. Also, U.S. Pat. No. 4,275,178 discloses a method for improving the powder properties such as bulk specific gravity and blocking resistance of the produced coagulated slurries or dry powders by adding a hard polymer thereto.

The former method characterized by the slow coagulation in the presence of a coagulant of a specific concentration is capable of providing a spherical powder with a narrow particle size distribution, but it has disadvantages in that because of high water content of the powder after dehydration, when a heat treatment is carried out at a high temperature during solidification for obtaining the solid particles, the fine individual particles in the coagulated particles may be fused together without compacted sufficiently, making it unable to obtain the coagulated particles with high density and, consequently there can not be obtained the particles of high bulk specific gravity.

The latter method characterized by the addition of a hard polymer for improving the powder properties is designed to elevate bulk specific gravity of the powder by densifying the filled structure of the coagulated particle agglomerates by such means as cohesion of the coagulated particles, but this method has the problem that the effect of improving the density of the coagulated particles themselves can not be expected and a powder with a well satisfactory bulk specific gravity can not be obtained.

The present inventors have pursued further studies with a view to solving the above problems and, as a result, found that a polymer powder with a high bulk specific gravity comprising the compacted particles can be obtained by adding a specific polymer and/or an inorganic compound to a coagulation slurry or polymer powder obtained from a thermoplastic polymer latex and compressing and comminuting the resulting polymer powder. The present invention has been attained on the basis of this finding.

DISCLOSURE OF THE INVENTION

The present invention provides a process for producing a thermoplastic polymer powder which comprises adding a polymer (B) and/or an inorganic compound (C) to a coagulation slurry of a thermoplastic polymer (A) obtained by emulsion polymerization and having a glass transition temperature Tg defined by the following equation (1) or to a polymer powder obtained by drying said coagulation slurry, said polymer (B) and/or inorganic compound (C) being added in an amount of 0.1–10 parts by weight to 100 parts by weight of said thermoplastic polymer (A), compressing the thermoplastic polymer (A) at a temperature in the range of (Tg−30) to (Tg+50)° C. and then comminuting the mixture:

$$Tg = W_1 \times Tg_1 + W_2 \times Tg_2 + \ldots + W_n \times Tg_n \tag{1}$$

(wherein n is the number of the monomers constituting the thermoplastic polymer (A); $W_1, W_2, \ldots W_n$ each represents the weight fraction of each monomer i (i=1, 2, ... n) in said polymer (A); and $Tg_1, Tg_2, \ldots Tg_n$ each represents the glass transition temperature of the polymer composed of each monomer i).

BEST MODE FOR CARRYING OUT THE INVENTION

Figure 1:
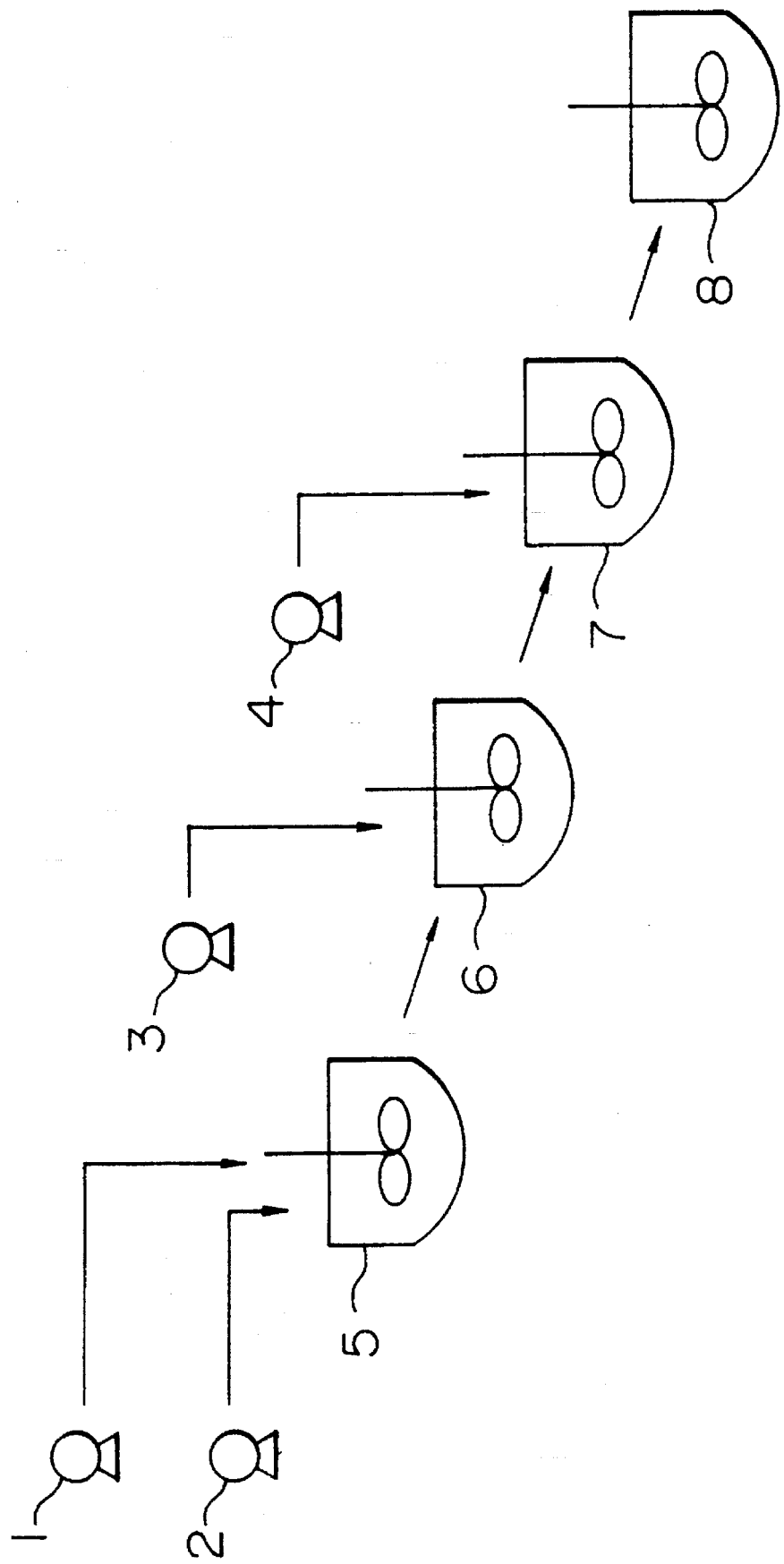
FIG. 1 is a diagrammatic illustration of the apparatus used in the production process of the present invention.

In the present invention, the method of emulsion polymerization may be one commonly practiced in the art. Also, the initiator and other polymerization assistants are not subject to any specific restrictions, and those commonly used in the art may be employed.

As the monomers usable for forming the thermoplastic polymer (A) in the present invention, there can be mentioned various types of copolymerizable monomers, for example, dienes such as butadiene, isopropylene and chloropropylene; alkyl acrylates such as butyl acrylate and octyl acrylate; alkyl methacrylates such as methyl methacrylate and ethyl methacrylate; vinyl cyanides such as acrylonitrile and methacrylonitrile; aromatic vinyl compounds such as styrene and α-methylstyrene; and vinyl halides such as vinyl chloride and vinyl bromide. These monomers may be used either singly or as a mixture of two or more of them.

Especially, the present invention is useful in case the thermoplastic polymer (A) is a graft copolymer obtained by emulsion polymerizing a hard polymer-forming monomer with an elastomeric backbone polymer, especially said type of graft copolymer in which the content of the elastomeric backbone polymer is 60% by weight or more.

As the elastomeric backbone polymers constituting said graft copolymers, there can be mentioned the polymers of dienes such as butadiene, isoprene and chloroprene; polymers of acrylic esters in which the alkyl group has 4–10 carbon atoms, such as butyl acrylate and octyl acrylate; and copolymers of dimethylsiloxane polymers and monomers coplymerizable therewith. As the copolymerizable monomers, there can be cited aromatic vinyl compounds such as styrene and α-methylstyrene; alkyl methacrylates such as methyl methacrylate and ethyl methacrylate; alkyl acrylates in which the carbon number of alkyl is 1–3, such as methyl acrylate and ethyl acrylate; and vinyl cyanides such as acrylonitrile and methacrylonitrile.

As the monomers forming a hard polymer, the following can be mentioned: aromatic vinyl compounds such as styrene and α-methylstyrene; alkyl methacrylates such as methyl methacrylate, ethyl methacrylate and butyl methacrylate; vinyl cyanides such as acrylonitrile and methacrylonitrile; and vinyl halides such as vinyl chloride and vinyl bromide. These monomers may be used either singly or as a mixture of two or more of them.

The thermoplastic polymer (A) in the present invention is one having a glass transition temperature Tg defined by the above-shown equation (1).

When a coagulant is added to a latex of thermoplastic polymer (A), the emulsified state of the latex gives way and the polymer particles which have been dispersed as emulsion in the latex are aggregated to form the particle agglomerates (which are hereinafter referred to as coagulated particles), and these coagulated particles are dispersed in a dispersing medium such as water to form a coagulation slurry. When polymer (B) and/or inorganic compound (C) are added to this slurry, said polymer (B) and/or compound (C) are adsorbed on the surfaces of the coagulated particles to bring about a qualitative improvement of the coagulated particles.

For further densifying the thus formed quality-improved coagulated particles, they are usually subjected to a heat treatment comprising heating them to a temperature above Tg of the thermoplastic polymer (A). This treatment is generally called solidification. The solidification temperature depends on Tg of the thermoplastic polymer (A), but the treatment is usually carried out at a temperature of 60°–120° C. The resulting slurry is dehydrated and dried, recovering the thermoplastic polymer (A) as a powder.

In the above process, polymer (B) and/or inorganic compound (C) are added to a slurry after coagulation, but in the present invention, said addition and mixing can be conducted at any stage as far as it is posterior to coagulation.

Solidification of the latex of thermoplastic polymer (A) can be effected by using any suitable method such as a method using a stirrer, a method in which the latex is injected into the coagulant from a nozzle, and a method in which the latex is atomized into a coagulant atmosphere.

However, when it is desired to enhance bulk specific gravity, it is preferred to carry out coagulation in, for example, two stages to obtain spherical particles with a narrow size distribution. In this case, for carrying out coagulation stably, it is desirable to allow a sulfuric ester type and/or sulfonic acid type anionic surfactant to exist in said polymer latex. The amount of this surfactant is preferably 0.05–0.5 parts by weight to 100 parts by weight of thermoplastic polymer (A). In applications where thermal stability is an important consideration, the amount of said surfactant added is preferably 0.05–0.15 parts by weight.

As the sulfuric ester type anionic surfactants, there can be cited, for example, higher alcohol sulfurates and polyoxyethylene alkylsulfates.

As the sulfonic acid type anionic surfactants, there can be mentioned, for example, alkyl sulfonates, alkylbenzene sulfonates, alkyl sulfosuccinates and alkyldiphenyl ether sulfonates. The surfactant may be added before, during or after polymerization.

When the amount of the surfactant added is less than 0.05 parts by weight, the emulsified state-retaining action of the surfactant undesirably becomes too weak to resist the emulsified state breaking action of the coagulant acid, making it difficult to control the state of precipitation of the coagulated particles in a stabilized way and to obtain a powdery polymer with a narrow particle size distribution. On the other hand, when the amount of the surfactant added exceeds 0.5 parts by weight, the emulsified state retaining action of the surfactant becomes too strong, making it unable to induce coagulation without using a large amount of acid.

As the coagulant used in the first stage coagulation, acids, for example, inorganic acids such as hydrochloric acid, sulfuric acid, phosphoric acid, etc., and organic acids such as formic acid, acetic acid, etc., can be mentioned. In the first stage coagulation, 40–80% by weight of the polymer in the latex is preferably coagulated. For determining the amount of the polymer coagulated, the coagulated slurry was filtered by Toyo filter paper No. 131 (JIS P3801, Class 3) and the polymer concentration in the filtrate was measured to determine the amount of the uncoagulated polymer, from which the amount of the coagulated polymer was calculated. When the amount of the coagulated polymer is less than 40% by weight, a substantial portion of the copolymer latex is undesirably coagulated under a strong emulsified state disrupting action at the time of completion of coagulation, making it difficult to obtain a powdery polymer with a narrow particle size distribution. When the amount of the coagulated polymer is greater than 80% by weight, the emulsified state disrupting action is too strong and it is difficult to obtain a powdery polymer with a narrow particle size distribution.

The acid used in the first stage coagulation is preferably added to the latex in such a way that the pH of the slurry during coagulation will meet the condition of the following formula (2):

$$pH \leq \frac{0.2}{X} + 2.0 \qquad (2)$$

(wherein X is parts by weight of the sulfuric ester type and sulfonic acid type anionic surfactants per 100 parts by weight of thermoplastic polymer (A)).

When the pH is greater than the value of the right member of the formula (2), the emulsified state retaining action of the surfactant becomes too strong vis-a-vis the emulsified state disrupting action of the acid, resulting in inhibiting occurrence of coagulation or requiring long time until coagulation occurs.

As the coagulant used in the second stage coagulation, the same acids as used in the first stage coagulation mentioned above and the salts thereof, for example, inorganic salts such as aluminium sulfate, magnesium sulfate, sodium chloride, calcium chloride, sodium sulfate, magnesium chloride, etc., and organic salts such as sodium acetate, calcium acetate, etc., can be cited. These acids and salts may be used either singly or as a mixture.

In case where thermal stability of the product counts, it is desirable that the pH of the slurry after perfect precipitation of the coagulated particles be adjusted to 2.0 or above. When the pH of the coagulation slurry is less than 2.0, the obtained polymer powder proves to be undesirably poor in thermal stability. In such a case, pH is preferably adjusted to be 2–4 with an alkali such as sodium hydroxide.

The polymer (B) used in the present invention is purposed to provide a powder quality improving action for enhancing the efficiency of the comminution step by adding it to thermoplastic polymer (A). Polymer (B) is preferably a resin having a glass transition temperature which is more than 50° C. higher than Tg of said polymer (A).

When the difference in glass transition temperature between thermoplastic polymer (A) and polymer (B) is less than 50° C., the powder reforming effect of polymer (B) undesirably lowers.

The glass transition temperature of polymer (B) used in the present invention can be represented by the above-shown equation (1) where thermoplastic polymer (A) is replaced with polymer (B). As the monomers forming polymer (B), there can be used the same monomers as those forming thermoplastic polymer (A).

The amount of polymer (B) and/or inorganic compound (C) added is 0.1–10 parts by weight, preferably 0.5–5 parts by weight, to 100 parts by weight of thermoplastic polymer (A). When the amount is less than 0.1 part by weight, the improvement of polymer (A) particle surface is insufficient and comminution of the powder after compaction becomes hard to perform in a desired way, making it unable to obtain the objective powder. When said amount exceeds 10 parts by weight, an undesirable change of the normal properties of thermoplastic polymer (A) may be caused.

The average particle size of polymer (B) and inorganic compound (C) is preferably not greater than 10 μm. When it exceeds 10 μm, it undesirably becomes necessary to add a large amount of polymer (B) and/or inorganic compound (C) for improving the polymer (A) particle surface. For producing the desired powder reforming effect by adding polymer (B) and inorganic compound (C) in small quantities, it is desirable that the particle size of polymer (B) and inorganic compound (C) is as small as possible, preferably less than 0.5 μm.

Polymer (B) and/or inorganic compound (C) may be added in the state of latex, solidified slurry or dry powder. The time of addition may be after coagulation, during the heat treatment, after the dehydration or after the drying of thermoplastic polymer (A), but in the case of a highly coherent polymer, it is preferably added to the coagulation slurry before solidified.

Especially in case thermoplastic polymer (A) is a graft copolymer obtained by emulsion polymerizing a hard polymer-forming monomer with an elastomeric backbone polymer and having an elastomeric backbone polymer content of 60% by weight or more, the powder reforming polymer (B) is preferably one which has a glass transition temperature higher than 25° C., preferably higher than 60° C. In this case, polymer (B) is preferably one produced from a monomer mixture containing at least 80% by weight of one or more of monomers selected from the group consisting of methyl methacrylate, ethyl methacrylate, propyl methacrylate, butyl methacrylate, styrene and α-methylstyrene. The rest of the monomer mixture may comprise other copolymerizable ethylenic unsaturated monomer(s), for example, soft polymer-forming monomers such as acrylates in which the alkyl group has 1–4 carbon atoms.

Inorganic compound (C) used in the present invention is designed to produce the same effect as polymer (B). As such compound, there can be used oxides, chlorides, hydroxides, carbonates and sulfates of one or more of elements selected from the group consisting of Si, Mg, Al, Ca, Ba, Zn and Ti, either singly or as a mixture thereof. Typical examples of such compounds are $SiO_2$, $MgO$, $Mg(OH)_2$, $MgCO_3$, $Al_2O_3$, $Al(OH)_3$, $Al_2(CO_3)_3$, $CaO$, $CaCO_3$, $TiO_2$, talc, clay, diatomaceous earth and calcium metasilicate. These inorganic compounds are preferably ones whose solubility in water at 25° C. is 0.5 g/100 ml or below.

The coagulated particles obtained in the present invention are subjected to a solidification treatment, then dehydrated and dried. The particles are usually solidified at a temperature in a range of 60°–120° C. When this solidification treatment is carried out at a high temperature for a long time, the water content of the wet powder after dehydration lowers, making it possible to reduce the heat energy required in the drying step.

Now, compaction of thermoplastic polymer (A) is discussed. Compaction is conducted for reducing the voids existing in the inside of the coagulated particles of the recovered powder of thermoplastic polymer (A). The powder of thermoplastic polymer (A) is formed into blocks. Since the coagulated particle surface has been reformed by polymer (B) and/or inorganic compound (C), said blocks can be easily comminuted to the original state of individual coagulated particles. Consequently, the voids in the inside of the coagulated particles are reduced and the inside of the particle is brought into a densified state. The available methods for compaction include, but are not limited to, tableting and briquetting by use of a compaction granulator or extrusion granulator. When the powder of thermoplastic polymer (A) is compacted without reforming of the coagulated particles, it is impossible to break down the blocks to reduce them into the original state of individual coagulated particles, making it unable to realize an increase of bulk specific gravity which is the object of the present invention.

Compaction of thermoplastic polymer (A) is carried out at a temperature in a range of (Tg–30) to (Tg+50)° C. (wherein Tg is glass transition temperature of thermoplastic polymer (A)). When compaction is conducted at a temperature below (Tg–30)° C., there can not be obtained the bulk specific gravity improving effect intended to provide in the present invention, and when compaction is carried out at a temperature exceeding (Tg+50)° C., the effect of polymer (B) and/or inorganic compound (C) fails to present itself, making it difficult to crush up the blocks in a desired way. A graft copolymer with an elastomeric backbone polymer content of 60% by weight or greater is especially useful as thermoplastic polymer (A) in the process of this invention as such a copolymer is effective for enhancing bulk specific gravity by compaction at around normal temperature.

The pressure used for compaction is 100–1,000 $kg/cm^2$, preferably 200–700 $kg/cm^2$, in terms of areal pressure, and 100–1,000 kg/cm, preferably 100–700 kg/cm, in terms of linear pressure. When the pressure applied is below the lower limit defined above, the densifying effect is insufficient and a satisfactory bulk specific gravity cannot be obtained. When the pressure exceeds the above-defined upper limit or when compaction is carried out without surface reforming of the coagulated particles, it is impossible to break up the blocks to return them to the original state of individual coagulated particles, making it unable to attain enhancement of bulk specific gravity purported in the present invention.

The compaction step may be carried out either after dehydration of thermoplastic polymer (A) or after drying thereof. Various means, for example, crushers such as hammer crusher, milling machines such as hammer mill or pin mill, and pulverizers such as jet mill can be used for breaking up the compacted blocks. These breaking means are properly selected according to the hardness of the blocks. They may be used in combination.

A typical example of apparatus used in carrying out the second stage coagulation in the process of this invention is here explained with reference to FIG. 1. A copolymer (A) latex is supplied into first tank 5 from metering pump 1 while an acid is also supplied into said tank from metering pump 2. First stage coagulation is accomplished in said first tank 5 and the coagulation slurry is overflown into second tank 6. The acid for enhancing the polymer recovery is supplied to second tank 6 from metering pump 3. Coagulation is completed in said second tank 6. To third tank 7 is supplied an alkali serving as a slurry pH adjustor from metering pump 4. The slurry is heat treated in fourth tank 8 and then further subjected to water washing, dehydration, drying, compaction and comminution, although not shown in the drawing, to obtain a desired polymer powder.

The present invention is described in further detail with reference to the examples thereof, which examples however are not to be construed as limiting the scope of the invention in any way. In the following Examples and Comparative Examples, all "parts" are by weight unless otherwise noted.

EXAMPLES 1

(1) Preparation of thermoplastic polymer (A-1)

| Composition of rubber latex | |
| --- | --- |
| 1,3-butadiene (Bd) | 75 parts |
| Styrene (St) | 25 parts |
| Divinylbenzene | 1 part |
| Ferrous sulfate | 0.006 part |
| Sodium pyrophosphate | 0.6 part |
| Diisopropylbenzene hydroperoxide | 0.4 part |
| Dextrose | 0.4 part |
| Potassium oleate | 1 part |
| Deionized water | 200 parts |

The feedstock of the above composition was supplied to a pressure autoclave and reacted with stirring at 50° C. for 48 hours to prepare a rubber latex (polymerization rate: 98%). One part of sodium chloride was added to 70 parts (as solids) of said rubber latex, followed by further addition of a mixed monomer consisting of 13 parts of methyl methacrylate, 2 parts of ethyl acrylate and 0.045 part of cumene hydroperoxide and 0.06 part of formaldehyde sodium sulfoxylate, and the mixture was subjected to first stage graft polymerization at 70° C. for 2 hours. Then, for second stage graft polymerization in the presence of the polymer obtained in the previous stage, a mixed monomer consisting of 15 parts of styrene and 0.06 part of cumene hydroperoxide was added and the mixture was subjected to second stage graft polymerization at 70° C. for 3 hours to obtain a latex of a thermoplastic polymer (A-1) (solids concentration: 36%; average particle size: 0.115 μm).

(2) Preparation of polymer (B-1)

A mixture consisting of 280 parts of deionized water, 1 part of sodium dioctylsulfosuccinate, 0.2 part of ammonium persulfate, 85 parts of methyl methacrylate, 15 parts of butylacrylate and 0.02 part of n-octylmercaptan was supplied to a reactor equipped with a stirrer and a reflux condenser. After replacing the inside atmosphere of the reactor with nitrogen, the reactor was heated to 65° C. with stirring and the mixture therein was polymerized by heating with stirring for 2 hours to obtain a polymer (B-1) (solids: 27.8%; average particle size: 0.13 μm).

(3) Production of polymer powder

Two hundreds grams of the thermoplastic polymer (A-1) latex was coagulated by using 600 g of 0.23% dilute sulfuric acid in a 2-litre vessel provided with a 6-vane fan turbine type stirrer. To the resulting slurry was added the polymer B-1 having a glass transition temperature 50° C. higher than that of A1, in the state of latex. Thereafter, the slurry was heated to the solidification temperature shown in Table 1, then dehydrated and dried to obtain a pulverulent body. This pulverulent body was compacted at the temperature and under the pressure shown in Table 1 and then comminuted to obtain a powder. Bulk specific gravity of the powder was measured according to JIS K-6721. The evaluation results are shown in Table 1.

EXAMPLE 2

Fifty percents by weight of styrene, 40% by weight of butyl acrylate and 10% by weight of methyl methacrylate were emulsion polymerized to obtain a latex of a thermoplastic polymer (A-2) (solids concentration: 33%; average particle size: 0.137 μm). By using the same apparatus as in Example 1.200 g of said polymer (A-2) latex was coagulated by using 0.18% dilute sulfuric acid. To the resulting slurry was added hydrophobic silica (B-2) (produced by Nippon Aerosil Co., Ltd.; Lot No. R972; average particle size: 0.014 μm). Thereafter, the slurry was heated to the solidification temperature shown in Table 1, then dehydrated and dried to obtain a pulverulent body. This pulverulent body was compacted at the temperature and under the pressure shown in Table 1 and then comminuted to obtain a powder. The evaluation results are shown in Table 1.

Comparative Example 1

The procedure of Example 2 was followed except that compaction was carried out at the temperature shown in Table 1 to obtain a powder. The evaluation results are shown in Table 1.

EXAMPLE 3

A thermoplastic polymer (A-3) was used in place of the polymer (B-1) latex used in Example 1, and 200 g of this polymer (A-3) latex was coagulated by using 0.27% dilute sulfuric acid. To the resulting slurry was added hydrophobic silica (B-2). Thereafter, the slurry was heated to the solidification temperature shown in Table 1, then dehydrated and dried to obtain a pulverulent body. This pulverulent body was compacted at the temperature and under the pressure shown in Table 1 and then comminuted to obtain a powder. The evaluation results are shown in Table 1.

TABLE 1

| | Example No. | Example 1 | Example 2 | Example 3 | Comp. Example 1 |
| --- | --- | --- | --- | --- | --- |
| Thermoplastic polymer latex | Type | A-1 | A-2 | A-3 | A-2 |
| | Tg (°C.) | 14 | 43 | 83 | 43 |
| | Amount (g) | 200 | 200 | 200 | 200 |
| Coagulant | Type | Dilute sulfuric acid | Dilute sulfuric acid | Dilute sulfuric acid | Dilute sulfuric acid |
| | Amount (g) | 600 | 600 | 600 | 600 |
| Comminuting assistant | Type | A-3 | B-1 | B-1 | B-1 |
| | Tg (°C.) | 83 | — | — | — |
| | Amount added (wt. part) | 2 | 1 | 5 | 1 |
| Stirring | Temperature (°C.) | 20 | 30 | 70 | 30 |

TABLE 1-continued

| Example No. | | Example 1 | Example 2 | Example 3 | Comp. Example 1 |
|---|---|---|---|---|---|
| tank | Stirring speed (rpm) | 300 | 300 | 300 | 300 |
| Solidification temperature (°C.) | | 95 | 95 | 95 | 95 |
| Compaction treatment temperature (°C.) | | 30 | 70 | 100 | 10 |
| Compaction treatment pressure (Kg/cm$^2$) | | 400 | 400 | 400 | 400 |
| Bulk density of powder obtained without compaction and comminuting treatments (g/cm$^3$) | | 0.31 | 0.35 | 0.35 | 0.35 |
| Bulk density of powder obtained after compaction and comminuting treatments (g/cm$^3$) | | 0.43 | 0.53 | 0.52 | 0.35 |

EXAMPLE 4

Fifteen parts by weight of styrene, 13.2 parts by weight of methyl methacrylate and 1.8 parts by weight of ethyl acrylate were graft polymerized onto 70 parts by weight of styrene-butadiene elastomeric backbone polymer to obtain a graft copolymer latex (solids: 36% by weight). The average particle size of the obtained latex was 0.1 μm, its pH was 8.0, and the types and amounts of the surfactants existing in the latex were as shown in Table 2.

The above latex was coagulated by using the apparatus shown in FIG. 1. First, said latex and the acid of the type shown in Table 2 were supplied to a first tank so that the pH of the mixture and the amount (%) of the coagulated polymer would have the values shown in Table 2. Then the acid of the type shown in Table 2 was supplied to a second tank so that the pH of the mixture would have the value shown in Table 2. Further, an alkali of the type shown in Table 2 was supplied to a third tank so that the pH of the mixture would have the value shown in Table 2. The temperature of each tank was controlled to have the value shown in Table 2. The slurry discharged out from a fourth tank was washed with water, dehydrated and dried, and then 0.5% by weight of hydrophobic silica (produced by Nippon Aerosil Co., Ltd.; Lot No. R972; average particle size: 0.014 μm) was dry blended to obtain a dry powder.

The obtained dry powder was compacted by a 50-mm diameter tableting machine under a pressure of 300 kg/cm$^2$ to form blocks. These blocks were comminuted by using a screen mill to obtain a polymer powder.

The bulk specific gravity of the obtained polymer powder and the degree of evenness and thermal stability of the powder particles were evaluated by the methods described below. The results are shown in Table 2.
Evenness of particles:

Evenness N of the particles was represented by the following equation:

$$N=D_{75}/D_{25}$$

(wherein $D_{75}$ is particle diameter (μm) at the 75% point of the cumulative weight distribution curve, and $D_{25}$ is particle diameter (μm) at the 25% point of the cumulative weight distribution curve).
Thermal stability:

The dry powder was put into a gear oven kept at 120° C. and the change of thermal coloration with time was visually evaluated by rating the state of coloration according to the following 3-grade criterion:

○: Almost no coloration.

Δ: Colored in yellow.

x: Scorched brown.

EXAMPLES 5 and 6

Polymer powders were obtained in the same way as in Example 4 except that the type of the surfactant existing in the latex, pH of the first tank and the amount of the coagulated polymer were changed as shown in Table 2. The evaluation results are shown in Table 2.

EXAMPLE 7

A polymer powder was obtained in the same way as in Example 4 except that the amount of the surfactant existing in the latex, pH of the first tank, the amount of the coagulated polymer and pH of the second tank were changed as shown in Table 2, and that no alkali was added to the third tank and its pH was changed as shown in Table 2. The evaluation results are shown in Table 2.

EXAMPLE 8

A polymer powder was obtained in the same way as in Example 4 except that the type and amount of the surfactant existing in the latex, pH of the first tank, the amount of the coagulated polymer and pH of the second tank were changed as shown in Table 2, and that no alkali was added to the third tank and its pH was changed as shown in Table 2. The evaluation results are shown in Table 2.

TABLE 2

| | | Example | | | | |
|---|---|---|---|---|---|---|
| | | 4 | 5 | 6 | 7 | 8 |
| Sulfuric ester type or sulfonic acid type anionic surfactant | Type | Sodium lauryl-sulfate | Sodium dioctyl-sulfosuccinate | Sodium dodecyl-benzene-sulfonate | Sodium lauryl-sulfate | Polyoxy-ethylene alkyl ether sodium sulfate |
| | Amount (part by weight) per 100 parts by weight of polymer | 0.2 | 0.2 | 0.2 | 0.08 | 0.1 |
| Other surfactant | Type | Potassium oleate | Potassium oleate | Potassium oleate | Potassium oleate | Potassium oleate |
| | Amount (part by weight) per 100 parts by weight of polymer | 1.0 | 1.0 | 1.0 | 1.0 | 1.0 |
| First tank | Type of acid | Sulfuric acid | Sulfuric acid | Sulfuric acid | Sulfuric acid | Sulfuric acid |
| | pH | 1.8 | 2.0 | 2.0 | 3.6 | 3.5 |
| | Temperature (°C.) | 40 | 40 | 40 | 40 | 40 |
| | Amount of coagulated polymer (%) | 65 | 72 | 57 | 58 | 50 |
| Second tank | Type of acid | Sulfuric acid | Sulfuric acid | Sulfuric acid | Sulfuric acid | Sulfuric acid |
| | pH | 1.5 | 1.5 | 1.5 | 2.2 | 2.1 |
| | Temperature (°C.) | 40 | 40 | 40 | 40 | 40 |
| Third tank | Type of alkali | NaOH | NaOH | NaOH | — | — |
| | pH | 3.0 | 3.0 | 3.0 | 2.2 | 2.1 |
| | Temperature (°C.) | 40 | 40 | 40 | 40 | 40 |
| Fourth tank | Temperature (°C.) | 85 | 85 | 85 | 85 | 85 |
| Water content (wet %) | | 49 | 48 | 50 | 47 | 46 |
| Compaction pressure (Kg/cm$^2$) | | 300 | 300 | 300 | 300 | 300 |
| Particle size distribution (%) | ≧840 μm | 1.2 | 0.3 | 0.5 | 1.1 | 0.6 |
| | 840–500 μm | 4.1 | 2.8 | 1.9 | 4.1 | 2.5 |
| | 500–210 μm | 25.6 | 20.9 | 27.4 | 25.8 | 26.0 |
| | 210–105 μm | 55.0 | 52.0 | 54.3 | 55.1 | 54.1 |
| | 105–37 μm | 13.5 | 23.8 | 15.6 | 13.4 | 16.7 |
| | ≦37 μm | 0.6 | 0.2 | 0.2 | 0.6 | 0.1 |
| Evenness of particles | | 1.8 | 1.9 | 1.9 | 1.8 | 1.9 |
| Bulk specific gravity after compaction (Bulk specific gravity before compaction) | | 0.42 (0.33) | 0.43 (0.32) | 0.43 (0.32) | 0.42 (0.32) | 0.44 (0.33) |
| Thermal stability | | o | o | o | o | o |

EXAMPLES 9 and 10

Polymer powders were obtained in the same way as in Example 8 except that the heat treatment temperature in the fourth tank was changed as shown in Table 3. The evaluation results are shown in Table 3.

EXAMPLES 11 and 12

Polymer powders were obtained in the same way as in Example 10 except that the compaction pressure was changed as shown in Table 3. The evaluation results are shown in Table 3.

TABLE 3

| | | Example | | | |
|---|---|---|---|---|---|
| | | 9 | 10 | 11 | 12 |
| Sulfuric ester type or sulfonic acid type anionic surfactant | Type | Polyoxy-ethylene alkyl ether sodium sulfate | Polyoxy-ethylene alkyl ether sodium sulfate | Polyoxy-ethylene alkyl ether sodium sulfate | Polyoxy-ethylene alkyl ether sodium sulfate |
| | Amount (part by weight) per 100 parts by weight of polymer | 0.1 | 0.1 | 0.1 | 0.1 |
| Other surfactant | Type | Potassium oleate | Potassium oleate | Potassium oleate | Potassium oleate |
| | Amount (part by weight) per 100 parts by weight of polymer | 1.0 | 1.0 | 1.0 | 1.0 |
| First tank | Type of acid | Sulfuric acid | Sulfuric acid | Sulfuric acid | Sulfuric acid |
| | pH | 3.5 | 3.5 | 3.5 | 3.5 |
| | Temperature (°C.) | 40 | 40 | 40 | 40 |
| | Amount of | 50 | 50 | 50 | 50 |

TABLE 3-continued

|  |  | Example | | | |
|---|---|---|---|---|---|
|  |  | 9 | 10 | 11 | 12 |
| Second tank | coagulated polymer Type of acid | Sulfuric acid | Sulfuric acid | Sulfuric acid | Sulfuric acid |
|  | pH | 2.1 | 2.1 | 2.1 | 2.1 |
|  | Temperature (°C.) | 40 | 40 | 40 | 40 |
| Third tank | Type of alkali | — | — | — | — |
|  | pH | 2.1 | 2.1 | 2.1 | 2.1 |
|  | Temperature (°C.) | 40 | 40 | 40 | 40 |
| Fourth tank | Temperature (°C.) | 90 | 95 | 95 | 95 |
| Water content (wet %) |  | 39 | 35 | 35 | 35 |
| Compaction pressure (Kg/cm$^2$) |  | 300 | 300 | 200 | 500 |
| Particle size distribution (%) | ≧840 μm | 0.5 | 0.5 | 0.5 | 0.6 |
|  | 840–500 μm | 2.5 | 2.6 | 2.7 | 2.7 |
|  | 500–210 μm | 26.2 | 26.0 | 26.0 | 26.0 |
|  | 210–105 μm | 54.1 | 54.1 | 53.9 | 53.9 |
|  | 105–37 μm | 16.6 | 16.7 | 16.8 | 16.7 |
|  | ≦37 μm | 0.1 | 0.1 | 0.1 | 0.1 |
| Evenness of particles |  | 1.9 | 1.9 | 1.9 | 1.9 |
| Bulk specific gravity after compaction (Bulk specific gravity before compaction) |  | 0.44 (0.31) | 0.43 (0.30) | 0.41 (0.30) | 0.47 (0.30) |
| Thermal stability |  | ○ | ○ | ○ | ○ |

EXAMPLE 13

12.5 parts by weight of styrene, 1 parts by weight of methyl methacrylate and 1.5 parts by weight of ethyl acrylate were graft polymerized onto 75 parts by weight of styrene-butadiene elastomeric backbone polymer to obtain a graft copolymer latex (solids: 36% by weight). The average particle size of the obtained latex was 0.1 μm, its pH was 8.0 and the types and amounts of the surfactants existing in the latex were as shown in Table 4.

The above latex and an acid of the type shown in Table 4 were supplied to the first tank so that its pH and the amount (%) of the coagulated polymer would have the values shown in Table 4. An acid of the type shown in Table 4 was supplied to the second tank so that its pH would have the value shown in Table 4. To the third tank, an alkali of the type shown in Table 4 was supplied so that the pH of the tank would have the value shown in Table 4. Further, a hard non-elastomeric polymer latex (solids: 25% by weight; average particle size: 0.1 μm) obtained by emulsion polymerizing 85 parts by weight of methyl methacrylate and 15 parts by weight of butyl acrylate was added in an amount of 2 parts by weight (calculated as solids) to 100 parts by weight of the graft copolymer. The temperatures of the respective tanks were controlled to have the values shown in Table 4. The slurry discharged out of the fourth tank was washed with water, dehydrated and dried to obtain a dry powder.

The obtained dry powder was compacted to form blocks by using a roller compactor (roll diameter: 10 inches; roll width: 4 inches). The obtained blocks were comminuted by using a Fitzmill mfd. by Hosokawa Micron Co., Ltd. to obtain a polymer powder. The evaluation results are shown in Table 4.

EXAMPLE 14

A polymer powder was obtained in the same way as in Example 13 except that the types and amounts of the surfactants existing in the latex, pH of the first tank, the amount of the coagulated polymer and pH of the second tank were changed as shown in Table 4, and that no alkali was added to the third tank and its pH was changed as shown in Table 4. The evaluation results are shown in Table 4.

EXAMPLES 15 and 16

Polymer powders were obtained in the same way as in Example 14 except that the heat treatment temperature in the fourth tank was changed as shown in Table 4. The evaluation results are shown in Table 4.

TABLE 4

|  |  | Example | | | |
|---|---|---|---|---|---|
|  |  | 13 | 14 | 15 | 16 |
| Sulfuric ester type or sulfonic acid type anionic surfactant | Type | Sodium lauryl-sulfate | Polyoxy-ethylene alkyl ether sodium sulfate | Polyoxy-ethylene alkyl ether sodium sulfate | Polyoxy-ethylene alkyl ether sodium sulfate |
|  | Amount (part by weight) per 100 parts by weight of polymer | 0.2 | 0.1 | 0.1 | 0.1 |
| Other surfactant | Type | Potassium oleate | Potassium oleate | Potassium oleate | Potassium oleate |
|  | Amount (part by weight)) per 100 parts | 1.0 | 1.0 | 1.0 | 1.0 |

TABLE 4-continued

| | | Example | | | |
|---|---|---|---|---|---|
| | | 13 | 14 | 15 | 16 |
| | by weight of polymer | | | | |
| First tank | Type of acid | Sulfuric acid | Sulfuric acid | Sulfuric acid | Sulfuric acid |
| | pH | 1.8 | 3.5 | 3.5 | 3.5 |
| | Temperature (°C.) | 20 | 20 | 20 | 20 |
| | Amount of coagulated polymer (%) | 66 | 52 | 52 | 52 |
| Second tank | Type of acid | Sulfuric acid | Sulfuric acid | Sulfuric acid | Sulfuric acid |
| | pH | 1.5 | 2.1 | 2.1 | 2.1 |
| | Temperature (°C.) | 20 | 20 | 20 | 20 |
| Third tank | Type of alkali | NaOH | — | — | — |
| | pH | 3.0 | 2.1 | 2.1 | 2.1 |
| | Temperature (°C.) | 20 | 20 | 20 | 20 |
| Fourth tank | Temperature (°C.) | 85 | 85 | 90 | 95 |
| Water content (wet %) | | 46 | 47 | 38 | 34 |
| Compaction pressure (Kg/cm$^2$) | | 300 | 300 | 300 | 300 |
| Particle size distribution (%) | ≧840 μm | 0.8 | 0.4 | 0.5 | 0.6 |
| | 840–500 μm | 2.0 | 2.7 | 2.6 | 2.5 |
| | 500–210 μm | 27.7 | 26.0 | 26.1 | 26.0 |
| | 210–105 μm | 54.0 | 54.1 | 54.0 | 54.1 |
| | 105–37 μm | 15.8 | 16.5 | 16.7 | 16.7 |
| | ≦37 μm | 0.1 | 0.3 | 0.1 | 0.1 |
| Evenness of particles | | 1.9 | 1.9 | 1.9 | 1.9 |
| Bulk specific gravity after compaction (Bulk specific gravity before compaction) | | 0.46 (0.32) | 0.45 (0.33) | 0.41 (0.30) | 0.47 (0.29) |
| Thermal stability | | ○ | ○ | ○ | ○ |

EXAMPLE 17

A polymer powder was obtained in the same way as in Example 7 except that pH of the first tank was changed as shown in Table 5, and that no acid was added to the second tank since coagulation had been completed in the first tank. The evaluation results are shown in Table 5.

EXAMPLE 18

A polymer powder was obtained in the same way as in Example 7 except that pH of the first tank and the amount of the coagulated polymer were changed as shown in Table 5. The evaluation results are shown in Table 5.

EXAMPLES 19 and 20

Polymer powders were obtained in the same way as in Example 8 except that pH of the second and third tanks was changed as shown in Table 5. The evaluation results are shown in Table 5.

TABLE 5

| | | Example | | | |
|---|---|---|---|---|---|
| | | 17 | 18 | 19 | 20 |
| Sulfuric ester type or sulfonic acid type anionic surfactant | Type | Sodium lauryl-sulfate | Sodium lauryl-sulfate | Polyoxy-ethylene alkyl ether sodium sulfate | Polyoxy-ethylene alkyl ether sodium sulfate |
| | Amount (part by weight) per 100 parts by weight of polymer | 0.08 | 0.08 | 0.1 | 0.1 |
| Other surfactant | Type | Potassium oleate | Potassium oleate | Potassium oleate | Potassium oleate |
| | Amount (part by weight) per 100 parts by weight of polymer | 1.0 | 1.0 | 1.0 | 1.0 |
| First tank | Type of acid | Sulfuric acid | Sulfuric acid | Sulfuric acid | Sulfuric acid |
| | pH | 1.4 | 4.2 | 3.5 | 3.5 |
| | Temperature (°C.) | 40 | 40 | 40 | 40 |
| | Amount of coagulated polymer (%) | 100 | 12 | 50 | 50 |
| Second tank | Type of acid | Sulfuric acid | Sulfuric acid | Sulfuric acid | Sulfuric acid |

TABLE 5-continued

|  |  | Example | | | |
|---|---|---|---|---|---|
|  |  | 17 | 18 | 19 | 20 |
|  | pH | 1.4 | 2.2 | 1.8 | 1.5 |
|  | Temperature (°C.) | 40 | 40 | 40 | 40 |
| Third tank | Type of alkali | — | — | — | — |
|  | pH | 1.4 | 2.2 | 1.8 | 1.5 |
|  | Temperature (°C.) | 40 | 40 | 40 | 40 |
| Fourth tank | Temperature (°C.) | 85 | 85 | 85 | 85 |
| Water content (wet %) |  | 35 | 40 | 46 | 45 |
| Compaction pressure (Kg/cm$^2$) |  | 300 | 300 | 300 | 300 |
| Particle size distribution (%) | ≧840 μm | 1.8 | 11.2 | 0.4 | 0.3 |
|  | 840–500 μm | 12.3 | 6.7 | 2.7 | 2.6 |
|  | 500–210 μm | 30.3 | 26.3 | 26.0 | 26.2 |
|  | 210–105 μm | 27.0 | 39.8 | 54.1 | 54.0 |
|  | 105–37 μm | 27.6 | 15.4 | 16.5 | 16.6 |
|  | ≦37 μm | 1.0 | 0.6 | 0.3 | 0.3 |
| Evenness of particles |  | 3.3 | 2.9 | 1.9 | 1.9 |
| Bulk specific gravity after compaction (Bulk specific gravity before compaction) |  | 0.35 (0.28) | 0.33 (0.29) | 0.44 (0.33) | 0.474 (0.33) |
| Thermal stability |  | x | o | Δ | x |

Comparative Examples 2 and 3

Polymer powders were obtained in the same way as in Example 7 except that the compaction pressure of the tableting machine was changed as shown in Table 6. The evaluation results are shown in Table 6. The blocks obtained in Comparative Example 3 were so solid that they could hardly be milled.

Comparative Examples 4 and 5

Polymer powders were obtained in the same way as in Example 14 except that the roll pressure of the roller compactor was changed as shown in Table 6. The evaluation results are shown in Table 6. The blocks obtained in Comparative Example 5 were so solid that they could hardly be milled.

TABLE 6

|  |  | Comparative Example | | | |
|---|---|---|---|---|---|
|  |  | 2 | 3 | 4 | 5 |
| Sulfuric ester type or sulfonic acid type anionic surfactant | Type | Sodium lauryl-sulfate | Sodium lauryl-sulfate | Polyoxy-ethylene alkyl ether sodium sulfate | Polyoxy-ethylene alkyl ether sodium sulfate |
|  | Amount (part by weight) per 100 parts by weight of polymer | 0.08 | 0.08 | 0.1 | 0.1 |
| Other surfactant | Type | Potassium oleate | Potassium oleate | Potassium oleate | Potassium oleate |
|  | Amount (part by weight) per 100 parts by weight of polymer | 1.0 | 1.0 | 1.0 | 1.0 |
| First tank | Type of acid | Sulfuric acid | Sulfuric acid | Sulfuric acid | Sulfuric acid |
|  | pH | 3.6 | 3.6 | 3.5 | 3.5 |
|  | Temperature (°C.) | 40 | 40 | 20 | 20 |
|  | Amount of coagulated polymer (%) | 58 | 58 | 52 | 52 |
| Second tank | Type of acid | Sulfuric acid | Sulfuric acid | Sulfuric acid | Sulfuric acid |
|  | pH | 2.2 | 2.2 | 2.1 | 2.1 |
|  | Temperature (°C.) | 40 | 40 | 20 | 20 |
| Third tank | Type of alkali | — | — | — | — |
|  | pH | 2.2 | 2.2 | 2.1 | 2.1 |
|  | Temperature (°C.) | 40 | 40 | 20 | 20 |
| Fourth tank | Temperature (°C.) | 85 | 85 | 85 | 85 |
| Water content (wet %) |  | 47 | 47 | 47 | 47 |
| Compaction pressure (Kg/cm$^2$ or Kg/cm) |  | 80 | 1500 | 50 | 1500 |
| Particle size distribution (%) | ≧840 μm | 1.2 | — | 0.4 | — |
|  | 840–500 μm | 4.1 | — | 2.7 | — |
|  | 500–210 μm | 25.6 | — | 26.0 | — |
|  | 210–105 μm | 55.1 | — | 54.1 | — |
|  | 105–37 μm | 13.4 | — | 16.5 | — |
|  | ≦37 μm | 0.6 | — | 0.3 | — |

TABLE 6-continued

| | Comparative Example | | | |
|---|---|---|---|---|
| | 2 | 3 | 4 | 5 |
| Evenness of particles | 1.8 | — | 1.9 | — |
| Bulk specific gravity after compaction (Bulk specific gravity before compaction) | 0.35 (0.32) | — (0.32) | 0.34 (0.33) | — (0.33) |
| Thermal stability | o | o | o | o |

Industrial Applicability

According to the present invention, it is possible to remarkably elevate bulk specific gravity of thermoplastic resins as compared with the case using the methods known in the art, and consequently, improvement of powder properties such as blocking resistance, fluidity, etc., can be expected. Also, efficient utilization of the storage space and incidental reduction of transportation cost can be attained.

We claim:

1. A process for producing a thermoplastic polymer powder which comprises the steps:
   (1) subjecting a latex of a thermoplastic polymer (A) containing a sulfuric ester type and/or sulfonic acid type anionic surfactant to a first stage coagulation by using an acid to effect 40–80 wt % coagulation,
   (2) further adding an acid and/or a salt to carry out a second stage coagulation and obtaining a coagulation slurry,
   (3) adding a polymer (B) and/or an inorganic compound (C) to the coagulation slurry obtained on completion of coagulation or to a polymer powder obtained by drying said coagulation slurry, in an amount of 0.1–10 parts by (A),
   (4) compacting the resulting mixture containing said thermoplastic polymer (A) at a pressure of 100–1,000 kg/cm$^2$ and a temperature in the range of (Tg–30) to (Tg–50)° C., Tg being the glass transition temperature of thermoplastic polymer (A), and then
   (5) commuting it.

2. A process for producing a thermoplastic polymer powder according to claim 1 wherein the glass transition temperature of the polymer (B) is 50° C. or more higher than the Tg of said thermoplastic polymer (A), and the average particle size of the polymer (B) and/or inorganic compound (C) is 10 μm or less.

3. A process for producing a thermoplastic polymer powder according to claim 1 wherein said latex of thermoplastic polymer (A) contains a sulfuric ester type and/or sulfonic acid type anionic surfactant in an amount of 0.05–0.5 parts by weight to 100 parts by weight of said thermoplastic polymer (A) and is subjected to a first stage coagulation at a pH defined by formula (2) by using an acid to form a slurry, and then said slurry is subjected to a second stage coagulation at a pH of 2.0 or above by using an acid to complete coagulation:

$$pH \leq \frac{0.2}{X} + 2.0 \quad (2)$$

wherein X is part(s) by weight of the sulfuric ester type and/or sulfonic acid type anionic surfactant to 100 parts by weight of the thermoplastic polymer (A).

4. A process for producing a thermoplastic polymer powder which comprises the steps:
   (1) adding a polymer (B) and/or an inorganic compound (C) to either
      a coagulation slurry obtained by coagulating a latex of a thermoplastic polymer (A) or a polymer powder obtained by drying said coagulation slurry, in an amount of 0.1–10 parts by weight to 100 parts by weight of said thermoplastic polymer (A), wherein polymer (A) is a graft copolymer obtained by emulsion polymerizing a monomer forming a hard polymer with an elastomeric backbone polymer and having an elastomeric backbone polymer content of 60% by weight or more,
   (2) compacting a powder containing said graft copolymer at a pressure of 100–1,000 kg/cm$^2$, and then
   (3) comminuting it.

5. A process for producing a thermoplastic polymer powder which comprises the steps:
   (1) subjecting a latex of a thermoplastic polymer (A) containing a sulfuric ester type and/or sulfuric acid type anionic surfactant to a first stage coagulation by using an acid to effect 40–80 wt % coagulation to form a slurry, said thermoplastic polymer (A) being a graft copolymer obtained by emulsion polymerizing a monomer forming a hard polymer onto an elastomeric backbone polymer, having an elastomeric backbone polymer content of 60% by weight or more,
   (2) further adding an acid and/or salt to carry out a second stage coagulation of said slurry,
   (3) adding a polymer (B) and/or an inorganic compound (C) to the coagulation slurry obtained on completion of coagulation or to a polymer powder obtained by drying said coagulation slurry, in an amount of 0.1–10 parts by weight to 100 parts by weight of said graft copolymer,
   (4) compacting a powder containing said graft copolymer at a pressure of 100–1000 kg/gm$^2$, and then
   (5) comminuting it.

6. A process for producing a thermoplastic polymer powder according to claim 5 wherein a latex of thermoplastic polymer (A) containing a sulfuric ester type and/or sulfonic acid type anionic surfactant in an amount of 0.05–0.5 parts by weight to 100 parts by weight of said thermoplastic polymer (A) is subjected to a first stage coagulation by using an acid in a pH range defined by the following formula (2):

$$pH \leq \frac{0.2}{X} + 2.0 \quad (2)$$

wherein X is part(s) by weight of the sulfuric ester type and sulfonic acid type anionic surfactant to 100 parts by weight of thermoplastic polymer (A).

* * * * *